Nov. 22, 1960   L. G. STAHLHUT ET AL   2,961,530
LIGHTING FIXTURE LENS MOUNTING
Filed May 12 1958   2 Sheets-Sheet 1
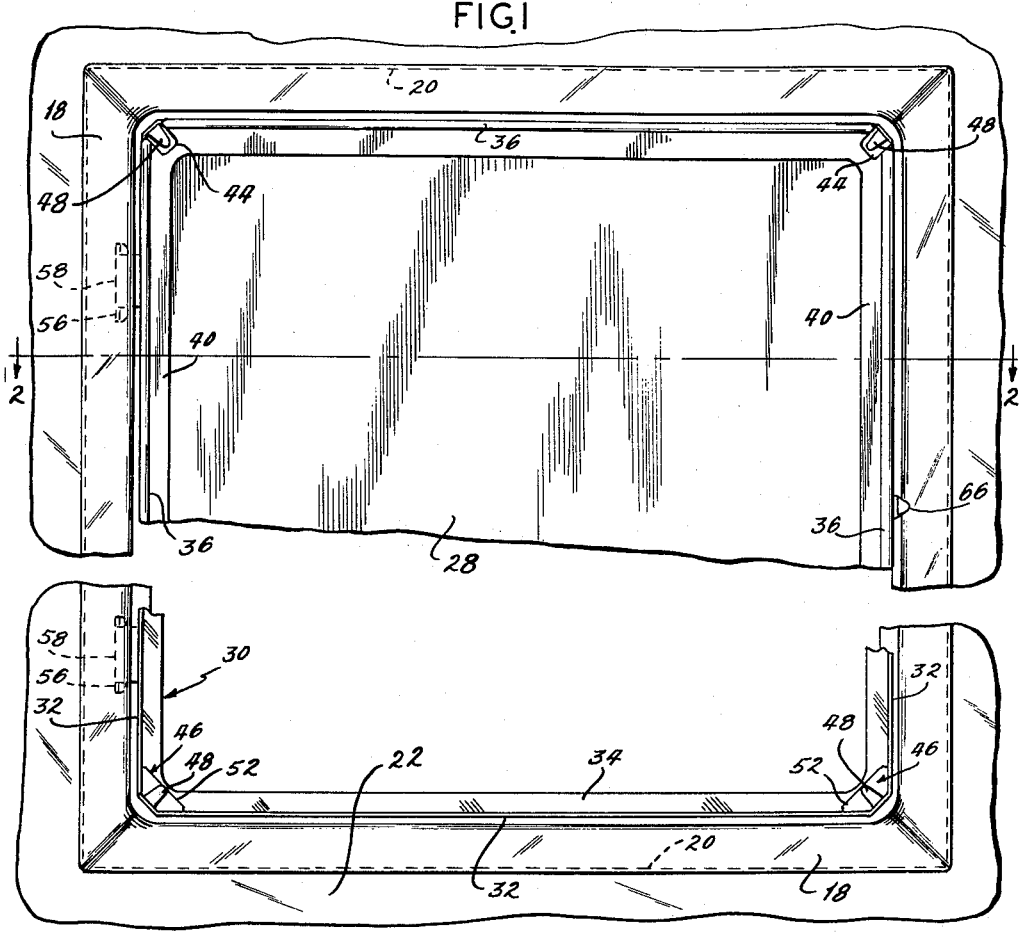
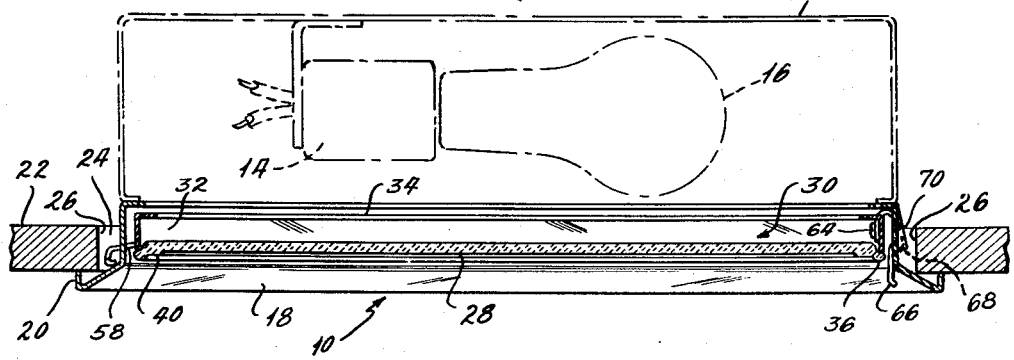
INVENTORS:
LEO G. STAHLHUT
WILLARD R. GARNETT
By Gravely, Lieder & Woodruff
ATTORNEYS Nov. 22, 1960 L. G. STAHLHUT ET AL 2,961,530
LIGHTING FIXTURE LENS MOUNTING
Filed May 12, 1958 2 Sheets-Sheet 2

INVENTORS:
LEO G. STAHLHUT
WILLARD R. GARNETT
BY Gravely, Lieder & Woodruff
ATTORNEYS © 2,961,530
Patented Nov. 22, 1960

2,961,530

LIGHTING FIXTURE LENS MOUNTING

Leo G. Stahlhut, Kirkwood, and Willard R. Garnett, Bellefontaine Neighbors, Mo., assignors to Day-Brite Lighting, Inc., St. Louis, Mo., a corporation of Missouri Filed May 12, 1958, Ser. No. 734,590

9 Claims. (Cl. 240—73)

This invention relates to improvements in lens mounting means for lighting fixtures.

A serious problem in lens type lighting fixtures has been the necessity to provide a suitable frame which would support a lens and, at the same time, cover the gap between the assembly and the surface opening in the wall or ceiling. The gap covering function has required a certain minimum width, but the formation of a seat for the lens in the same frame has unduly increased the flange width. Also, a lens adapted to be laid in on a frame seat is always subject to being dropped and broken during installing, servicing or relamping the fixture, and unsightly finger marks, smudges and the like are incurred with this character of construction. The leakage of light around the lens margin has also been a problem with these prior assemblies since such leakage causes halo effects and bright lines to detract from the appearance of the fixture. The light leakage problem is overcome in a novel manner, as will appear hereinafter.

It is an object of this invention, therefore, to overcome the foregoing problems which have heretofore existed in lighting fixtures in a novel manner and with means which are simple to construct and assemble.

An object of this invention is to provide a mounting frame for a lighting fixture which has an outer frame to cover the gap between the fixture assembly and the opening in the wall or ceiling surface to receive the assembly, and to provide a lens frame which is hidden from view but which firmly supports the lens in position.

It is also an object of this invention to avoid the problem of lens breakage in lighting fixtures which have heretofore provided a seat for lenses which are merely laid in place by providing a frame which carries the lens and is hidden by the lens when installed.

A further object of the invention is to provide a simple two part frame for lighting fixtures in which an outer frame has a visible flange to cover the gap in the surface opening to receive the assembly and is provided with means to secure an inner frame firmly carrying a lens, the inner frame being hidden from view by the lens but which is easily separated from the outer frame for relamping the fixture.

A still further object of the invention is to provide a concealed lens supporting frame and to effect the concealment by novel means hereinafter to be described in detail.

Other objects of this invention reside in the construction and arrangement of parts and elements of the assembly hereinafter described.

The present invention consists in providing a lighting fixture of lens type with a frame having a visible gap covering flange which can be made narrow and pleasing in appearance and to detachably mount a lens in the frame by a protective frame which is concealed from view and avoids the detrimental effects of light leakage by preventing the occurrence of light leakage in the first place. The light leakage referred to is the usual effect produced by positioning the opaque flanges of two parts in adjacent relation, whereby the gap or line of separation forms an opening through which light may escape. The present invention, therefore, comprises forming the lens with a luminous edge in place of one of the usual opaque flanges to carry the luminous effect of the lens out to the single opaque flange which is visible, thereby avoiding the effect of light leaking at a parting line between two opaque strips.

The invention may consist in one or more constructions having the foregoing characteristics, and a presently preferred embodiment thereof is shown in the accompanying drawings and will be described in detail whereby a better understanding of the principles of the improvement can be obtained.

In the drawings:

Fig. 1 is a plan view, looking upwardly from beneath the lighting fixture, showing the improved fixture installed in a ceiling surface and disclosing in broken fragmentary plan the characteristics of the lens and lens frame disposed within the fixture housing;

Fig. 2 is a sectional elevational view of the assembly as seen at line 2—2 in Fig. 1;

Figure 3:
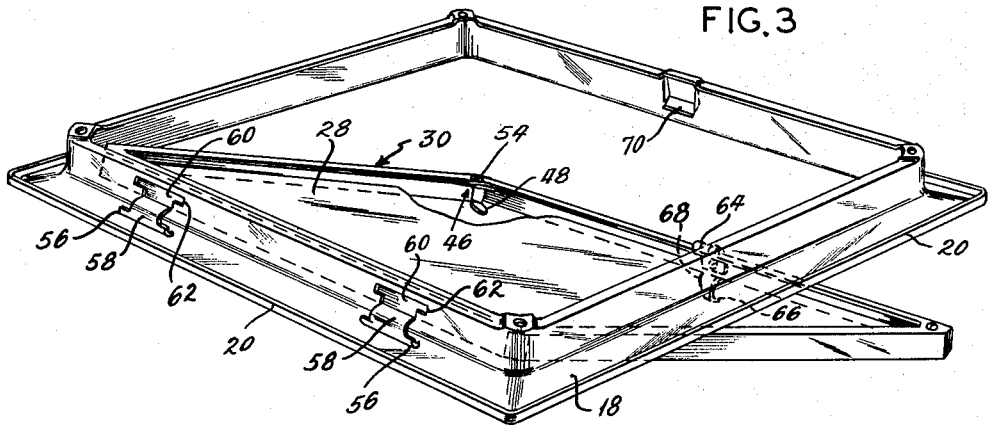
Fig. 3 is a perspective view of the assembly of Fig. 1 showing the means whereby the lens and its protective frame may be detachably mounted in the fixture frame.

In the drawings, and with reference to Figs. 1, 2 and 3 in particular, the lighting fixture assembly 10 comprises a lamp housing 12 in which the socket 14 and lamp 16 are suitably disposed. The housing 12 has a front face frame 18 with a visible molding flange 20 or other peripheral formation to fit against the ceiling surface 22 and close the gap 24 between the ceiling opening 26 and the housing 12. The frame 18 in the example shown, has its visible face inwardly sloped toward a recessed opening in which the lens 28 is disposed to fit with a working clearance, and the visible face is opaque in character.

Figure 4:
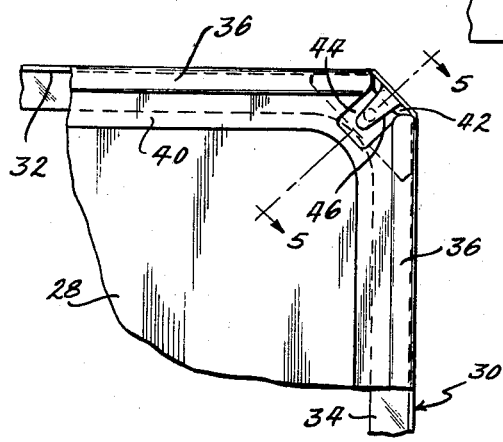
Fig. 4 is a greatly enlarged fragmentary view of a typical lens supporting assembly carried by the protective frame.
Figure 5:
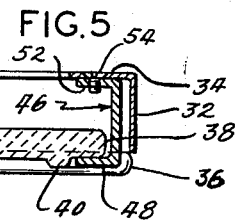
Fig. 5 is a sectional view taken along line 5—5 in Fig. 4.
Figure 6:
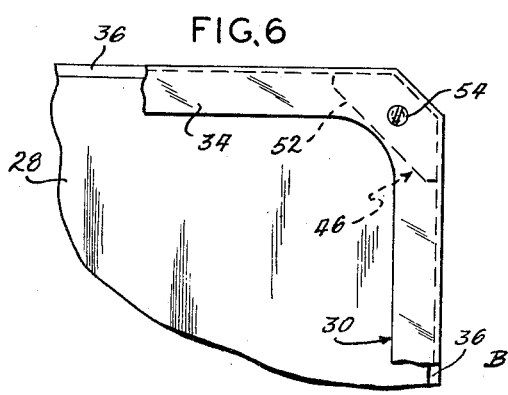
Fig. 6 is a greatly enlarged fragmentary view from above of the lens supporting assembly carried by the protective frame.
Figure 7:
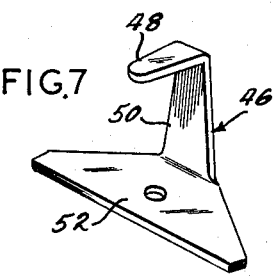
Fig. 7 is a perspective view of a bracket of the character shown in Fig. 1.

The lens 28, as best seen in Figs. 3 to 6, is mounted in a protective frame 30 formed with a peripheral portion 32 which surrounds the periphery of the lens, and a backing portion 34 spaced from the rear face of the lens. Thus, the lens 28 is carried in a stiff frame which protects the same in an efficient and simple way, the backing portion contributing stiffness to the frame as a whole. The attachment of the lens within the frame 30 is effected in a novel manner. In Figs. 4, 5 and 6, the lens 28 is shown formed with a lip 36 on its exposed face edge, which lip extends outwardly of the base edge 38 of the lens and is visible about the periphery of the lens since the lens is luminous in character. Inwardly of the lip 36, the lens face has a rib formation 40 which is suitable for a thin section lens, but may be omitted in the case of a lens having a thick section. The formation 40 is luminous like the entire face of the lens and tends to be inconspicuous with the lamp 16 turned on. Each corner of the lens 28 is cut away or the lips 36 along the margin are interrupted to form a notch 42, and each notch 42 has a shallow recess 44 which extends into the lens body or, as in this example, in the exposed face of the lens. A bracket member 46 (Fig. 7) for each notch 42 has a supporting finger 48 bent at right angles to a leg 50 so that it may engage in the recess 44 and support the lens. The base portion 52 of each bracket is detachably connected to the frame 30 by a suitable threaded element 54 which extends through the backing portion 34 and into the base 52. The fingers 48 are adjusted either in manufacture or by subsequent bending to hold the lens lip 36 snugly against the frame periphery 32 so that the edge 38 is fully masked against light leakage, except through the body of the lens. Thus, stray light and halo effect is fully avoided and all light is caused to traverse the lens 28. Since the lip 36 extends over the frame 30, except for a small and insignificant portion in the area of each notch 42, the frame is effectively concealed without lessening the strengthening function thereof, and the snug fit of the lip 36 on the frame periphery improves the strengthening function.

In Figs. 1, 2 and 3 there is shown one method of detachably connecting the lens 28 and its frame 30 to the face frame 18. The frame 30 is formed with one or more (two being shown) projections 58, and each projection has an elongated terminal portion 56 which is wider than the rest of the projection to form a hinge key. The frame 18 has an aperture 60 therein shaped in the form of a key hole, that is to say the aperture has a widened portion 62 to receive the hinge key 56 which passes behind the frame wall, and a narrower portion to snugly receive the projection 58. At a position opposite the projections 58, the frame 30 carries a resilient detent 64 with a finger 66 extending from the free end thereof to a location exposed at the lens margin. The detent 64 has a shoulder 68 which engages upon a ledge 70 formed in the frame wall by a suitable die operation.

The assembly of the lens 28 in the frame 18 is believed to be understood. In Fig. 3, the lens frame is shown angled into the face frame until the projecting hinge keys 56 engage in the key holes 62 so that the projection 58 may pass behind the apertures 60. The frame and lens may then be pivoted upwardly into the face frame opening until the resilient detent 64 reaches the proper position (Fig. 2) to force its shoulder 68 onto the ledge 70 to lock the frame in position. Removal of the frame and lens is effected by depressing the detent finger 66 to clear shoulder 68 from the ledge 70, after which the parts will pivot about the hinge key 56 to an angular position. Thereafter, the parts may be elevated sufficiently to lift the hinge key 56 through the key hole 62.

The foregoing description of a preferred form of this invention has set forth the principles of the improvement of simply and inexpensively disposing a lens and frame in cooperative engagement to protect the lens and avoid light leakage effects by carrying the periphery of the lens out to the frame flange so that the luminous effect of the lens is carried to the extreme periphery which is visible, and of detachably mounting the lens and frame parts in the fixture so that the lens can be prevented from falling or from being accidentally dropped. Also the improvement of providing a single face flange effect, while avoiding the halo effect which is so distracting, is fully explained by the concealment of the lens frame in the manner set forth. No limitations are intended except as the same may be imposed in and by the appended claims.

What is claimed is:

1. In mounting means for disposing a lens in a lighting fixture having light emitting opening framed by a visible opaque face flange and a lamp set inwardly of the face flange, the improvement of a luminous lens disposed in the light emitting opening, lip means on the periphery of said lens visible adjacent the face plane thereof and a base edge inwardly off-set relative to said lip forming a recess in the periphery of said lens, spaced notches formed in said lens and each notch having a recess portion, a lens frame having an opaque peripheral portion set in said peripheral recess embracing the base edge of said lens adjacent said lip means to mask edge light emitted through said lens, means connecting said lens and lens frame together including elements engaged in said notch recessed portions to hold said lens with its lip means adjacent said lens frame peripheral portion, and other means supporting said lens frame in the lighting fixture opening, said lip means concealing the opaque peripheral portion of said lens frame whereby the opaque lighting fixture face flange alone is visible as a frame for said lens.

2. The mounting means improvement set forth in claim 1, wherein said elements engaged in said notch recessed portions are bent relative to other portions of said connecting means, and said connecting means are detachably connected to said lens frame.

3. The mounting means improvement set forth in claim 1, wherein said lens has a visible face side and said lip means is formed in the plane of said face side with said recesses also visible, and said connecting means has its elements bent outwardly to engage in said recesses.

4. The mounting means improvement set forth in claim 1, wherein said other means comprises hinge key projections and a resilient detent engageable in the lighting fixture inwardly of the face flange thereon, and a detent finger is formed on said detent and is exposed along side said lip means to be accessible for manipulation to release said lens and lens frame as a unit form the lighting fixture.

5. A lighting fixture comprising a normally stationary housing having a light emitting opening, a flanged structure framing said light emitting opening and having a narrow opaque moulding flange extending about the opening in position to be seen, a luminous lens disposed in said light emitting opening and substantially filling the opening to provide a luminous face visible to the periphery of said lens, said lens having a peripherally extending lip in the plane of said luminous face which is also luminous and a peripheral base edge portion behind said lip which is inwardly offset-set to be covered by said lip, and means removably securing said lens in said opening including a mounting frame having a peripheral portion abutting the peripheral base edge portion of said lens behind said lip of its luminous face, elements connecting said lens and mounting frame in assembly, and other elements detachably retaining said mounting frame on the fixture within the light emitting opening, whereby the luminous face of said lens is extended by said lip to said narrow opaque face of said flanged structure.

6. A lighting fixture comprising a normally stationary housing provided with a flanged structure defining a light emitting opening, said structure including an opaque moulding flange narrow in proportion to its length about the light emitting opening and a wall angularly related to said flange, said wall having an opening at one side and a ledge in an opposite side, a removable luminous lens disposed in said light emitting opening and providing a luminous face visible out to and including the periphery thereof, said lens periphery providing a lip at the visible face and an inwardly off-set base edge behind said lip so as to be hidden from view, and said peripheral lip having spaced recesses therein, and means mounting said luminous lens in said opening comprising a frame having an opaque wall portion seated against said lens base edge to cut-off light leakage therethrough and not to obscure light passing to said lip, elements carried by said frame and having fingers disposed to engage in said lens lip recesses, and other elements carried by said frame to engage in said wall opening and at said ledge for removably supporting said frame.

7. A lighting fixture comprising a frame structure enclosing a lamp and having a face flange which is visible, a lens carried by said fixture adjacent said face flange, said lens having a face surface providing a luminous area which is visible out to its peripheral limits and being formed with a back surface which is of less area than said face surface, said difference in area providing an edge portion on said lens adjacent said back surface which is inwardly off-set so as to be hidden from view from the exterior of the lighting fixture by said face surface, and means connecting said lens to said fixture including a lens frame embracing the lens at said inwardly off-set edge portion to cut off light leakage between said face flange of said frame and the visible luminous area of said lens face surface, said lens frame preventing light from by-passing the face surface of said lens and causing a halo-light effect about said lens.

8. In a lighting fixture, a normally stationary lamp housing for a lamp, a housing face flange adapted to be exposed to view, said face flange being opaque, a removable lens adapted to be framed about its periphery by said face flange and to provide a luminous area bounded by said opaque face flange, a protective frame and for said lens, said lens having an inner base edge and an outer peripheral lip, said base edge and lip forming a recess about the lens periphery concealing said protective frame from view and said protective frame closely embracing the inner base edge of said lens adjacent said peripheral lip to mask stray light emitted at said inner base edge, bracket means detachably connected to said protective means and connecting said protective frame to said lens including support fingers bent over to engage the lens adjacent its periphery, and means supporting said protective frame in the housing inwardly of said face flange to be concealed by said lens, said peripheral lip carrying the luminous effect of said lens out to said opaque face flange.

9. The lighting fixture as set forth in claim 8, wherein said peripheral lip projects outwardly adjacent to the face plane of said lens, said protective frame is formed with a peripheral portion embracing the inner base edge of said lens inwardly of said projecting lip and with a backing portion behind said lens, and said bracket means is detachably secured to said backing portion.

References Cited in the file of this patent
UNITED STATES PATENTS

| | | |
|---|---|---|
| 1,413,415 | McPeek | Apr. 18, 1922 |
| 1,751,751 | Oetjen | Mar. 25, 1930 |
| 2,630,522 | MacDougall | Mar. 3, 1953 |
| 2,701,840 | Carlson | Feb. 8, 1955 |
| 2,836,708 | Bobrick | May 27, 1958 |
| 2,852,663 | Stuffer et al. | Sept. 16, 1958 |